(No Model.)

E. A. & C. P. CORNILLIE.
REFRIGERATOR.

No. 546,112. Patented Sept. 10, 1895.

Witnesses
Geo. W. Louey.
N. E. Oliphant

Inventors.
Edward A. Cornillie.
Charles P. Cornillie.
By H. G. Underwood,
Attorney

UNITED STATES PATENT OFFICE.

EDWARD A. CORNILLIE AND CHARLES P. CORNILLIE, OF MILWAUKEE, WISCONSIN.

REFRIGERATOR.

SPECIFICATION forming part of Letters Patent No. 546,112, dated September 10, 1895.

Application filed March 21, 1894. Serial No. 504,525. (No model.)

*To all whom it may concern:*

Be it known that we, EDWARD A. CORNILLIE and CHARLES P. CORNILLIE, citizens of the United States, and residents of Milwaukee, in the county of Milwaukee, and in the State of Wisconsin, have invented certain new and useful Improvements in Refrigerators; and we do hereby declare that the following is a full, clear, and exact description thereof.

Our invention has for its object to provide thoroughly non-conductive refrigerators; and it consists in certain peculiarities of construction and combination of parts hereinafter specified with reference to the accompanying drawings and subsequently claimed.

Figure 1:
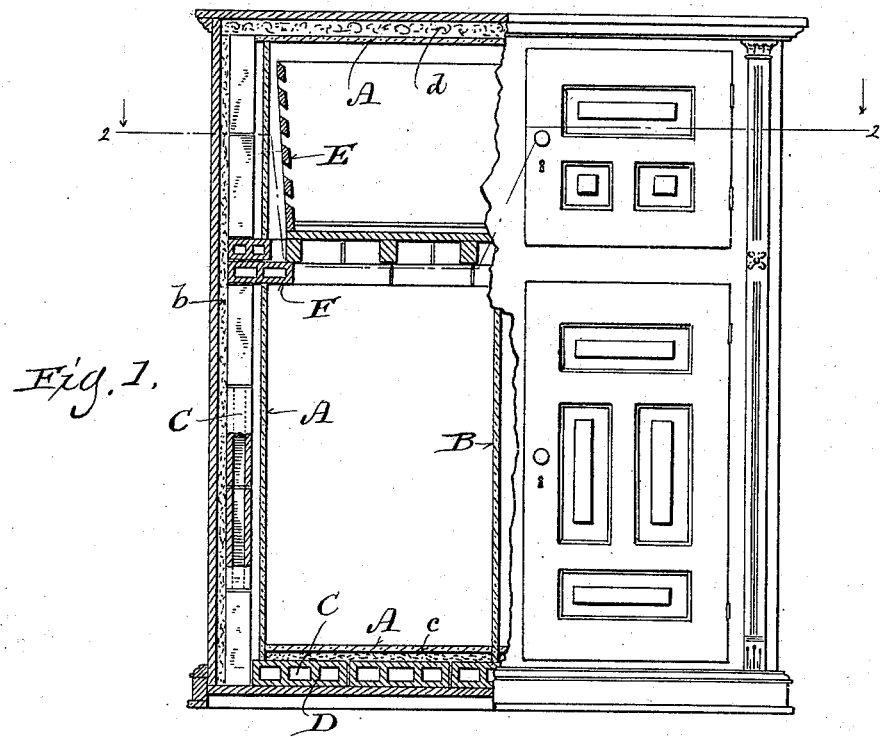
Figure 2:
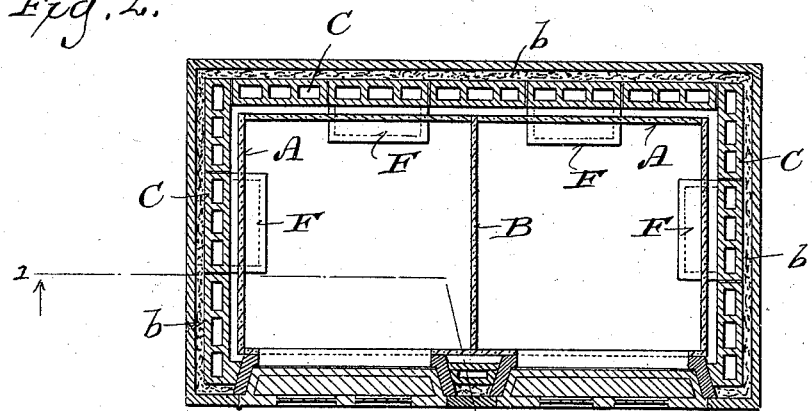

In the drawings, Figure 1 represents an elevation of a refrigerator constructed according to our invention and partly in section, the view being taken on line 1 1 of the succeeding figure; and Fig. 2 a horizontal section taken on line 2 2 of the preceding figure.

Referring by letter to the drawings, A represents the lining of our improved refrigerator, this lining being of glass, and as herein shown the cooling-chamber may be divided into compartments by a partition B, also of glass. The vertical glass plates are set in from the adjacent walls C to form a dead-air space, and these walls are built from hollow brick in order to increase the amount of dead-air space outside the glass lining.

Outside the walls C we employ a filling $b$ of asbestos, mineral wool, or other good non-conductive substance, and the latter is held in place by a casing of wood or such other material as may be found desirable.

The bottom D of the refrigerator may be of incased hollow brick, as herein shown, or of any other suitable material, and intermediate of this bottom and the glass floor or lining we employ a filling $c$ of non-conductive substance similar to that above specified. Intermediate of the top of the refrigerator and glass lining we also employ a filling $d$ of the non-conductive substance hereinbefore set forth.

As a matter of detail, we show the ice-tray E supported on ledges F, projecting inward from the walls C, and as a matter of convenience in setting the glass plates that serve as the lining for said walls we jog the latter horizontally at a certain height and extend the jog far enough to serve as a support for that portion of said lining within the ice-chamber.

Our invention is especially adapted for such refrigerators as are built in a house, and it is to be observed that the glass lining is non-absorbent, while the dead-air space intermediate of said lining and said walls and the outer filling of non-conductive material are thorough guards against outside influences upon the air circulated within said refrigerators.

Having now fully described our invention, what we claim, and desire to secure by Letters Patent, is—

A refrigerator having hollow brick walls provided with jogged inner ledges for the support of an ice-tray and glass lining plates, these and similar plates in the provision chamber being set in from the walls, a stay-casing outside the walls, and a non-conductive filling between said walls and casing.

In testimony that we claim the foregoing we have hereunto set our hands, at Milwaukee, in the county of Milwaukee and State of Wisconsin, in the presence of two witnesses.

EDWARD A. CORNILLIE.
   CHARLES P. CORNILLIE.

Witnesses:
 H. G. UNDERWOOD,
 N. E. OLIPHANT.